Dec. 22, 1970          H. B. GROW          3,548,539
BARRIER CONTROLLED TOY VEHICLE
Filed March 15, 1968
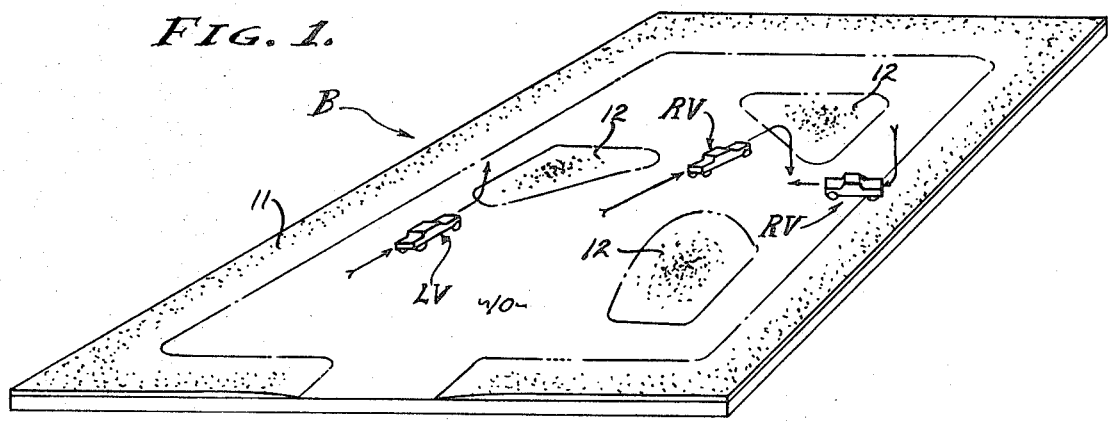
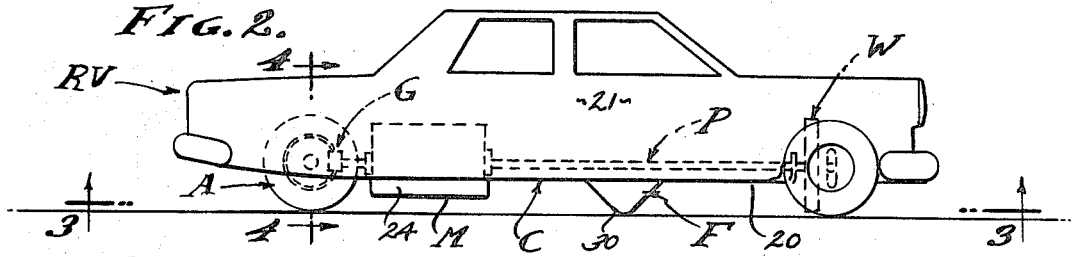
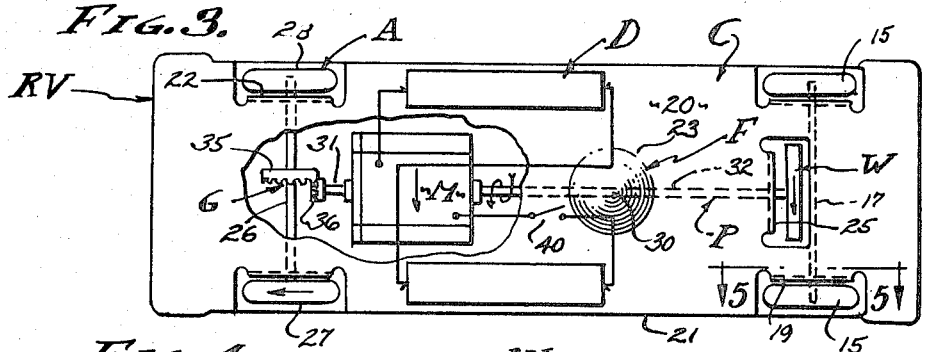
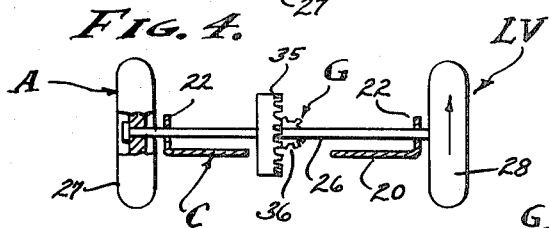
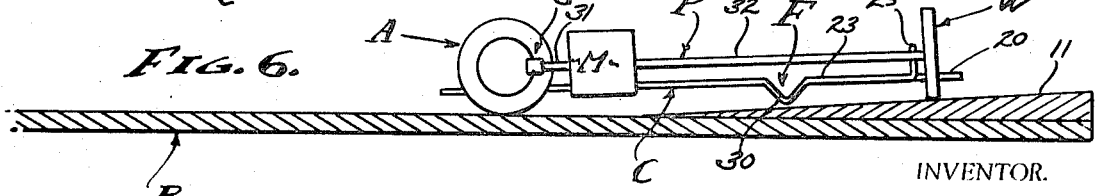
INVENTOR.
HARLOW B. GROW
BY
AGENT

United States Patent Office 3,548,539
Patented Dec. 22, 1970

3,548,539
BARRIER CONTROLLED TOY VEHICLE
Harlow B. Grow, 1650 Chattanooga Place,
Pacific Palisades, Calif. 90272
Filed Mar. 15, 1968, Ser. No. 713,440
Int. Cl. A63h 17/40
U.S. Cl. 46—211
9 Claims

ABSTRACT OF THE DISCLOSURE

A toy vehicle that is self-propelled upon a planar surface and turned away from the edges and any other areas made impassible by barriers. The barriers control the direction of propulsion at relatively high rates of speed and effect turning into avenues of direction with assured rapidity and without projection of the vehicle beyond the barriers. To these ends the vehicle comprises forward and aft supports, the aft support being wheeled and the wheel at one rear corner of the vehicle being powered. The forward support is preceded by a turning wheel held off the planar surface and operable in a direction normal to the operation of said powered wheel. And, the controlling barrier comprises an inclined plane that engages said turning wheel to lift the forward support off the planar surface while simultaneously effecting turning and/or redirection, right or left as the case may be.

---

The toy vehicle art provides variations in self-propelled machines that approach the precipitous edge of a supporting planar surface, and by means of a predetermined action turn about and depart from said edge. Such machines involve a prime mover, a pair of laterally spaced supporting wheels at the rear and one of which is driven by the prime mover, a slide support at the front, and an intermediate turning wheel normally held off the supporting surface and trackably operable in a direction normal to the traction of said powered wheel. In another prior art form, the said turning wheel is replaced by a friction pivot that is normally held above the supporting surface. In any case, the turn-about action is gained by virtue of the slide support, or the like, falling off of the precipitous edge. Consequently, the momentum of forward motion in such prior art machines must necessarily be restricted to low values so as to avert sliding off of and/or over the precipitous edge; that is, high rates of forward speed are not possible with the prior art machines. For example, the prior art machines employing said friction pivot must operate very slowly, in order for said pivot to slide to a stop a distance from said edge which is greater than the radius distance from said pivot to the driving wheel. For another example, the prior art machines employing said turning wheel operate at a moderate speed, since the turning wheel is active and not passive and precedes the turning radius dimension. However, in each instance the object and/or function is to extend a portion of the vehicle over the precipitous edge before turning action commences, all of which may be spectacular but not conducive to approach and turning away from said edge at high rates of forward speed.

Another consideration of the prior art is the balance required because of the extension of a portion of the vehicle over the precipitous edge. Also, it is a requirement of such vehicles that an edge be provided as a condition precedent to turning action. Characteristically therefore, the prior art machines of the type under consideration have rearwardly placed centers of gravity and are limited to turning action initiated by the presence of an edge over which the vehicle body must be extended.

An object of this invention is to provide a self-propelled vehicle which is responsive to the placement of barriers and which is operable at relatively high rates of forward speed in order to qualify as a "racer" and while negotiating turns away from and without transgressing over said barriers.

Another object of this invention is to provide a barrier for a self-propelled vehicle and/or the combination thereof, said barrier being substantially imperceptible and extremely versatile in its application, and said combination of barrier and vehicle resulting in a reliable predetermined rule of action that is inherently conducive to the application of high rates of inertia and resulting in rapid action in effecting the turn-about function.

It is still another object of this invention to provide a barrier for the purpose hereinabove referred to and which is adapted to be fashioned to any reasonable plan form as circumstances require. With the present invention an inclined plane of slight degree is employed and which can be, for all practical purposes, substantially imperceptible. In practice, said inclined plane can take the form of a marginal barrier and any number of internal barriers. Further, it is an object of this invention to provide a machine in the form of a vehicle of the character referred to and which is inherently decelerated upon engagement with the inclined plane of said marginal and/or internal barriers and which has a predetermined turning or turn-about action that is immediately and inherently effective upon said engagement of the vehicle with said barriers.

A further object of the present invention is to provide a vehicle of the character thus far described and which advantageously employs a prime mover characterized by a single propeller shaft which simultaneously transmits force to both the powered support wheel and turning wheel. Wtih the present invention the transmission of torque to the powered support wheel is readily reversed from the right support wheel to the left support wheel, and with reversal of rotation of the prime mover the vehicle is made to turn either right or left as may be required. In practice, it is advantageous to employ a battery powered motor as the prime mover, in which case the weights and balances involved are used to advantage in the action imposed by the barriers hereinabove referred to.

The various objects and features of this invention will be fully understood from the following detailed description of the typical preferred form and application thereof, throughout which description reference is made to the accompanying drawings, in which:

FIG. 1 is a perspective view of a board and a multiplicity of toy vehicles operating thereon and controlled by barriers superimposed on the planar surface of the board. FIG. 2 is an enlarged side elevation of one of the vehicles. FIG. 3 is a bottom view taken as indicated by line 3—3 on FIG. 2. FIGS. 4 and 5 are sectional views taken as indicated by lines 4—4 and 5—5 on FIGS. 2 and 3 respectively. And, FIG. 6 is a diagrammatic view illustrating the function of the vehicle as related to the controlling barriers that are superimposed upon the planar surface of the board.

The invention involves a vehicle and barrier control in combination with said vehicle, it being a primary object to provide an amusement toy that displays an accelerated action resembling a race or derby. In practice, a multiplicity of like vehicles are operated within the confines of a marginal barrier, the individual vehicles being each adapted to turn left or right. Consequently, there is provided a planar element in the form of a table or board B and upon which right turning vehicles RV and left turning vehicles LV are operated to be controlled by the marginal and internal barriers as hereinafter described. More specifically, the board B involves a horizontally disposed platform 10, a marginal barrier 11 and one or more internal barriers 12; while the vehicles RV and LV are alike and essentially identical and each involving a chassis C, an aft support A, a forward support F, a prime mover M with a propeller shaft P, a drive gear G, a turning wheel W and means D to power the prime mover M.

Referring now to the planar element in the form of a table or board B, it is to be understood that the utility of the vehicles RV and LV requires the existance of a supporting planar surface. Such a surface must be more or less horizontal and devoid of any inclination that would render a wheel propelled vehicle inoperative. As a practical matter, a simple horizontal surface is useable to advantage, and as shown the board B presents the flat top surfaced platform 10 upon which the barriers 11 and 12 are superimposed. The barriers 11 and 12 are of a variety of shapes, all as may be desired, and without limitation as to extent and/or configuration. Primarily, it is the barrier 11 which is required in order to keep the vehicles RV and LV within the confines of the board B, and to this end the barrier 11 extends continuously around the perimeter of the board. However, the barrier 11 can be interrupted if so desired, or it may have removable sections. Secondarily, the internal barrier or barriers 12 are provided so as to controllably effect turning of the vehicles RV and LV when they are operated intermediate the barriers 11 and/or transversely of the board B. Specifically, the barriers 11 and 12 are elongated inclined planes that merge with or fair into the platform 10, and in the case of barrier 11 extends upward and outward to the edge of the board B, while in the case of the barriers 12 extends upward and downward as a hill. Characteristically, the incline is slight and the ultimate elevation of the barrier a distance greater than the clearance of he turning wheel W as hereinafter described. In practice, the board B is a sheet of plywood or the like, and the barriers sheets of veneer, or the like, all tapered in cross section so as to establish the said slight inclinations as shown. The barriers can be integral with the board or separable and/or later attached. The internal barriers 12 are of random shapes, the elongation of the inclined planes encompassing the same, the marginal barrier 11 being generously rounded at the corners of the board B, all as clearly illustrated throughout the drawings.

Referring now to the vehicles RV and LV, as clearly shown they are operable in combination with the above described board B with its barriers 11 and 12. One or more vehicles operates upon the board B, and preferably a multiplicity of vehicles is simultaneously operated thereupon, both right and left turning. Thus, an exciting effect is gained in that the said vehicles are self-propelled at relatively high rates of speed and each has its built in ability to turn either right or left when encountering any one of the above described inclined planes of the barriers 11 and 12.

Each vehicle is like the other insofar as the chassis C, aft support A, forward support F, prime mover M and propeller shaft P, drive gear G, turning wheel W and means D are concerned; and it is the aft support A as it is related to the drive gear G and propeller shaft P which distinguishes a vehicle RV from a vehicle LV. And, although any vehicle can take on a distinctive appearance or resemblance to some particular type of vehicle in real life, they are identical for the purpose of the following description.

The vehicle chassis C is an elongated structure, shown in the form of a passenger auto, being an envelope fabricated to have an underpan 20 with a conventionally appearing shell 21. The shell has the general and detailed features that make it a miniature auto, and the underpan 20 and shell 21 combine to make a rigid and structurally sound unit. As shown, the interior of the shell is commodious and adapted to receive and to mount the components that make up the vehicle RV and/or LV responsive to turning when encountering a barrier 11 and/or 12. For example, the chassis C includes aft support mountings 22, a forward suport area 23, a prime mover mounting 24, a turning wheel support 25 and a mounting for the means D.

The aft support A is a wheeled support located aft of the center of gravity and that rolls upon the planar surface of the platform 10, to trackably guide the motion of the vehicle. As shown, the support A involves a transversely disposed axle 26 extending between the mountings 22, and a wheel carried at each axle end. That is, there is a left wheel 27 and a right wheel 28 and one of which is free wheeling upon the axle while the other is driven by the axle, and both of which rollingly support the chassis C. In the event that a right turning vehicle RV is desired, then the right wheel 28 is free wheeling while the left wheel 27 is fixed to turn with the axle 26 (see FIG. 3). On the other hand, in the event that a left turning vehicle LV is desired, then the left wheel 27 is free wheeling while the right wheel 28 is fixed to turn with the axle 26 (see FIG. 4). As shown, the periphery of each wheel engages the platform 10 with a normal underpan clearance, and for adequate traction the driven wheel, at least, is tyred for frictional engagement designed to efficiently propel the vehicle.

The forward support F is shown as a sliding support located forward of the center of gravity and substantially rearward of the front end of the chassis C. The support F can be a wheeled support oriented to steer and guide the vehicle in a straight line and/or along an arcuate path if so desired, or as is shown it can be a slipper 30 depending from the area 23 and having an anti-friction face slideably engaging the platform 10 maintaining a normal underpan clearance at the area 23 and forward portion of the chassis C. In carrying out the invention, the slipper 30 is located centrally of the underpan 20 about midway between the aft support A and the turning wheel W. Thus, the vehicle maintains a horizontal disposition when traveling over a substantially flat planar surface.

The prime mover M' with the propeller shaft P occupies the interior of the shell 21, preferably in a placement intermediate the two supports A and F and thereby establishing the mean center of gravity of the vehicle. In the preferred form, the prime mover M is an electric motor although it can be a spring motor,, and in any event it forms a heavy part of the vehicle structure. In accordance with the invention, the prime mover M operates two drive shafts, one extended rearwardly and one extended forwardly, and in the preferred form wherein an electric motor is employed the single shaft of the motor has a rearward extension 31 and a forward extension 32. In practice, the motor axis and shaft extensions 31 and 32 extend centrally of the chassis C, the extension 31 reaching to the area of axle 26 and the extension 32 reaching to the area of the front end of the chassis C. The motor frame of the prime mover M is secured to the mounting 24, the two spaced motor bearings forming the primary support for said extensions 31 and 32.

The drive gear G is provided to revolve the axle 26 in a direction to rotate the driving wheel, 27 or 28 as the case may be, to propel the vehicle forwardly. In accordance with the invention, the drive gear G involves a right angularly related ring gear 35 and pinion gear 36, the latter being fixed to the terminal end of the shaft extension 31 while the former is carried by the axle 26 to be driven in said forward direction of rotation as hereinabove described. The vehicle is either a right turning vehicle RV or a left turning vehicle LV, and accordingly the pinion gear 36 is located to operate intermediate the ring gear 35 and the wheel being driven, wheel 27 or 28 as the case may be. Therefore, in the case of a vehicle RV the pinion 35 operates between ring gear 36 and the wheel 27 while in the case of a vehicle LV the pinion gear 35 operates between ring gear 36 and the wheel 28. The placement of the gears 35 and 36 is significant for the proper directional drive of the turning wheel W next to be described, and proper turning of either wheel 27 or 28 is effected by simply reversing rotation of the prime mover M, all as circumstances require.

The turning wheel W is provided to effect turning of the vehicle to the right or left, as determined by the direction of rotation of the shaft extension 32. In accordance with the invention, the wheel W is driveably carried at the terminal end of shaft extension 32 to be continuously driven thereby. The shaft extension 32 is journaled at its terminal end by the turning wheel support 25, the periphery of the turning wheel W being held clear of the supporting platform 10 and juxtapositioned thereto during normal operation of the vehicle over a flat planar surface. However, the lowermost peripheral portion of turning wheel W is engageable with the inclined surfaces of the barriers 11 and 12, with which it is engageable to drive the forward end portion of the vehicle either right or left as the case may be. As shown, the turning wheel W will engage a barrier to lift the forward support F off the supporting surface, while simultaneously effecting traction in a lateral direction.

When a prime mover M in the form of an electric motor is employed, the means D to power the prime mover is a battery or batteries as shown. Thus, the mounting is in the form of battery clips with one side of the battery circuit grounded and the other side closed through a switch 40 to energize the motor. The direction of motor rotation is determined by the polarity of the battery connections through the switch 40, so that the traction wheel 27 or 28, as the case may be, drive forwardly.

As shown throughout the drawings, there are non-bearing front wheels 15 at the forward portion of the vehicle, for the sake of presenting a realistic appearance. Mountings 19 are provided for locating the wheels 15, and as best illustrated in FIG. 5 the said mountings involve vertically disposed slots 16 that shiftably receive axle 17 that carries the two normally spaced front wheels. Thus, the wheels 15 have no supporting function and simply roll upon any supporting surface engaged thereby.

With the gear relationship hereinabove described the turning wheel W will turn the vehicle away from the barrier that is encountered. In practice, engagement of wheel W with an inclined plane of barrier 11 and/or 12 is substantial when the vehicle encounters the barrier at a good rate of speed. As a consequence, the vehicle will slide up the barrier incline; that is, the wheel W will push up and onto the barrier and the frictional engagement of its tyre in sliding sideways relative to its rotary axis has a braking action which is increased by the degree of barrier incline and which is enhanced by the lifting action against gravity. Consequently, the vehicle inherently decelerates as it gradually penetrates the barrier 11 and/or 12, while the turning wheel simultaneously frictionally engages or bites into the inclined surface to have supporting engagement therewith and to accelerate down hill in a transverse direction to turn the vehicle about and away from said barrier and into a new direction of movement, after which the vehicle again accelerates to its normal rate of speed over the flat plane of the board B. Thus, the momentum of the vehicle is advantageously employed with a slowing down effect when climbing a barrier incline and accompanied by increased friction at the turning wheel, and with a restoring of momentum when descending a barrier incline and to the end that forward motion of the vehicle is uninterrupted.

Having described only a typical preferred form and application of my invention, I do not wish to be limited or restricted to the specific details herein set forth, but wish to reserve to myself any modifications or variations that may appear to those skilled in the art.

Having described my invention, I claim:

1. In combination, a horizontally disposed board having a flat plane and at least one slightly upwardly inclined plane merged with and continuing from said flat plane, and a toy vehicle operable to move forwardly upon said flat plane and adapted to turn when advanced upon said slightly inclined plane, and including, a chassis, an aft support for carrying the rear of the chassis and comprising a pair of spaced and rotatable wheels on a transversely disposed axis, a forward support for carrying the front of the chassis and comprising an element holding the chassis normally spaced from said flat plane and positioned intermediate said first mentioned support and the front of the chassis, a turning wheel on a longitudinally disposed axis and positioned at the front of the chassis forward of said forward support and normally held spaced from and juxtapositioned above said flat plane, and drive means rotating a wheel of the aft support and said turning wheel, said turning wheel having peripheral supporting engagement with said slightly inclined supporting plane to frictionally engage therewith and propel the front of the vehicle laterally to turn said vehicle into a new direction of forward movement upon re-engagement of said forward support with said flat plane.

2. The board and vehicle combination as set forth in claim 1, wherein said element of the forward support is a wheel steering the vehicle in its forward motion when operating upon said flat plane.

3. The board and vehicle combination as set forth in claim 1, wherein said element of the forward support is a slipper slideably engaging upon said flat plane.

4. The board and vehicle combination as set forth in claim 1, wherein the center of gravity of the vehicle is disposed intermediate the aft and forward support.

5. The board and vehicle combination as set forth in claim 1, wherein the driving wheel has a frictional tread.

6. The board and vehicle combination as set forth in claim 1, wherein the turning wheel has a frictional tread.

7. The board and vehicle combination as set forth in claim 1 and wheerin the said slightly upwardly inclined plane is a barrier at the periphery of the board.

8. The board and vehicle combination as set forth in claim 1 and wherein the said slightly upwardly inclined plane is an internal barrier intermediate the edges of the board.

9. The board and vehicle combination as set forth in claim 1 and wherein one of said slightly upwardly inclined planes surrounds the board at the periphery thereof, and at least one other slightly upwardly inclined plane is in the form of a hill and positioned within the confines of the surrounding inclined plane.

References Cited

UNITED STATES PATENTS

| 2,096,333 | 10/1937 | Marx | 46—211 |
| 2,461,672 | 2/1949 | Adamczyk | 46—211 |

FOREIGN PATENTS

| 432,164 | 7/1935 | Great Britain | 46—211 |
| 432,946 | 4/1948 | Italy | 46—211 |

LOUIS G. MANCENE, Primary Examiner

J. N. ESKOVITZ, Assistant Examiner

U.S. Cl. X.R.

46—243; 273—86.6